L. BAUM & C. SANDLER.
LOCK FOR AUTOMOBILES.
APPLICATION FILED JUNE 11, 1912.
1,065,103.
Patented June 17, 1913.
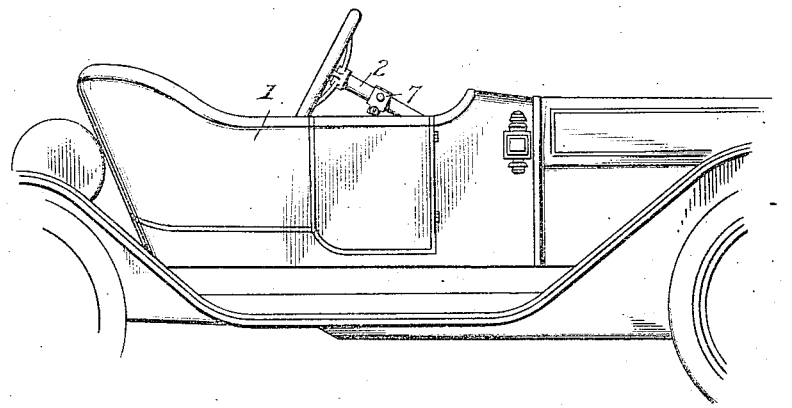
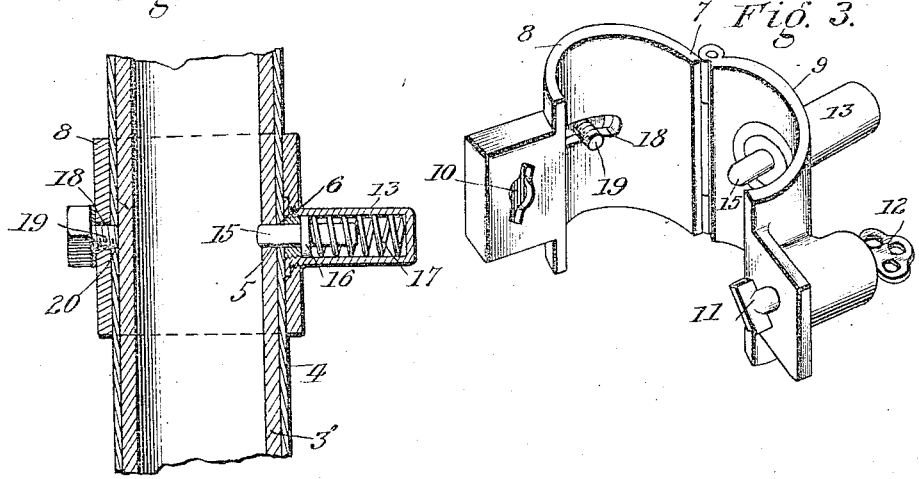
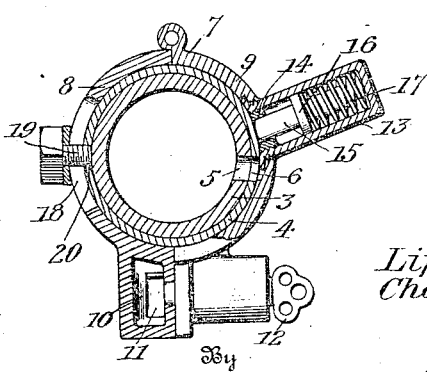
Inventors
Lippman Baum and
Charles Sandler

UNITED STATES PATENT OFFICE.

LIPPMAN BAUM AND CHARLES SANDLER, OF WASHINGTON, DISTRICT OF COLUMBIA.

LOCK FOR AUTOMOBILES.

1,065,103.   Specification of Letters Patent.   Patented June 17, 1913.

Application filed June 11, 1912. Serial No. 703,050.

*To all whom it may concern:*

Be it known that we, LIPPMAN BAUM and CHARLES SANDLER, citizens of the United States, residing at Washington, in the District of Columbia, have invented certain new and useful Improvements in Locks for Automobiles, of which the following is a specification.

Our invention relates to new and useful improvements in locks, and more particularly to locks for automobiles, and the primary object of the invention is to provide a device of this character which may be readily and quickly applied to the steering post of an automobile to prevent the theft of the machine.

A further object of the invention resides in the provision of a device which may be carried on the steering post in its ineffective position and which, when given a partial rotary movement, will be effectively disposed to prevent the rotation of the steering post.

Another object resides in providing a sleeve member formed in sections hinged one to the other with means to lock the same on a stationary object, and still another object resides in providing a spring forced pin on one of said sections adapted to enter alining openings in the steering post and casing therefor.

A still further object is to provide a device which is extremely simple in construction, inexpensive to manufacture and one which will be very efficient in operation.

With these and other objects in view, our invention consists in the novel features of construction, combination and arrangement of parts as will be hereinafter referred to and more particularly pointed out in the specification.

In the accompanying drawing forming a part of this application: Figure 1 is a side elevation of an automobile, showing our device applied to use thereon. Fig. 2 is a vertical section through the steering post, showing the device in its effective position thereon. Fig. 3 is a perspective view of the device removed, and Fig. 4 is a horizontal section through the steering post, showing our device in its ineffective position thereon.

In describing our invention we shall refer to the drawing, in which similar reference characters designate corresponding parts throughout the application and in which—

1 indicates an automobile of the usual or any preferred type having the customary steering post 2 thereon, said post being of the usual type comprising the inner movable post 3 carrying the operating wheel and the outer tubular casing 4. Our invention contemplates a means to prevent the rotation of this inner post 3, and to this end said post, which in most instances is hollow, is provided with an opening 5, while the outer casing 4 is also provided with an opening 6, said openings being so arranged as to aline with one another at a predetermined position of the steering post and front axle of the machine (not shown). A sleeve member 7 comprising a pair of arcuate sections 8 and 9 hinged one to the other is adapted to be applied to the post and a socket 10 formed as an extension on the free end of the section 8 is adapted to receive a rotating locking bolt 11 therein, said bolt being carried on an extension of the free end of the section 9 and operated by means of a key 12.

Threaded on the section 9 is a tubular extension 13, the outer end of which is closed, while the inner end thereof terminates in a contracted opening 14. A locking pin or stud 15 slidably mounted in said extension has formed intermediate of its ends a collar 16 which limits the movement of said pin and encircling said pin between the collar and the outer closed end thereof is a coil spring 17. The tendency of this spring is to force the pin or stud 15 inwardly toward the axial center of the sleeve, but the collar 16 will limit such movement and if the sleeve 7 is locked on the steering post in its ineffective position, as shown in Fig. 4 of the drawing, said pin will be forced inwardly against the tension of the spring.

The sleeve member 7 is of such a diameter when locked as to be capable of a rotary movement on the steering post, and we have provided means for retaining the device in position on the post so as to allow the pin 15 to enter the alining openings 5 and 6 when said device is rotated. To this end the section 8 is provided with a slot 18 in the same horizontal plane with the opening 14 in the section 9, and a small screw 19 is disposed through this slot and engaged with a threaded opening 20 in the outer casing 4 of the steering post. The head of this screw is not caused to bind against the outer face of section 8, but is so applied as to allow a slight play therebetween for the movement of the sleeve 7, and in this sense said screw forms a guide means for the latter.

In practice, the screw 19 is first entered through the slot 18 of the sleeve 7 and engaged with the opening 20 of the outer casing 4, whereupon the sections 8 and 9 are clamped together and locked on the post in a position as shown in Fig. 4, so that the stud or pin 15 is beyond the openings 5 and 6. The key 12 is then removed and the device allowed to remain in this position on the steering post until such time as it is desired to lock the machine, and in this sense the device may be said to be permanently carried on the steering post. When it is desired to lock the machine, the operator merely gives the sleeve 7 a partial rotation, it being understood that the openings 5 and 6 are already alined, and as the pin or stud 15 registers with said openings 5 and 6 the same will spring therein and prevent further operation of the steering post. The operator may now leave the machine without danger of having same stolen and upon his return it is only necessary to insert the key and operate the locking bolt to separate the sections 8 and 9. A separation of said sections will permit the pin 15 to be disengaged and allow the sleeve to be again rotated to its initial position and locked for further use, as shown in Fig. 4.

From the foregoing, it will be seen that we have provided an improved device which will be positive and efficient in its operation to prevent the theft of automobiles and it will further be seen that the same is simple and durable in construction and inexpensive to manufacture.

While we have particularly described the elements best adapted to perform the functions set forth, it is obvious that various changes in form, proportion and in the miner details of construction may be resorted to without departing from the spirit or sacrificing any of the principles of the invention.

Having thus described our invention, what we claim is:

1. The combination with a stationary tubular member and a rotatable member therewithin, said members having openings therein adapted for registration; of a sleeve formed of hinged sections, means to secure said sections together on the stationary member to permit rotation thereon, means to guide and limit said sleeve in its rotative movement, and a yielding projection on the inner face of said sleeve adapted to enter the registering openings of said members.

2. The combination with a stationary tubular member and a rotatable member therewithin, said members having openings therein adapted for alinement; of a sleeve formed in sections hinged one to the other, one of said sections being provided with a slot therein, means extending through said slot and engaged with said stationary member to adjustably retain said sleeve on the latter, a yielding projection extending from the inner face of the other section of said sleeve and adapted to enter the alining openings, and means to lock the sections of said sleeve together.

3. The combination with a stationary tubular member and a rotatable member therewithin, said members each having an opening therein adapted for alinement; of a sleeve comprising a pair of hinged sections, means to lock said sections together, means to movably retain said sleeve on the stationary member, and a spring held stud projecting beyond the inner face of one of the sections of said sleeve and adapted to enter the alined openings of said members.

4. The combination with a stationary tubular member and a rotatable member therewithin, said members each having an opening therein adapted for alinement; of a sleeve comprising a pair of hinged sections, means to lock said sections together, means to retain said sleeve on the stationary member and permit a partial rotation thereon, a tubular extension carried on one of said sections, and a spring forced stud in said extension adapted to project beyond the inner face of said section and enter the alining openings of said members.

5. In a device of the class described, the combination with stationary and movable members, each having an opening therein adapted for registration with one another; of a sleeve member loosely applied to said stationary member, means to limit the movement of said sleeve member, and means yieldingly carried on said sleeve member and adapted for engagement with the registering openings of the first mentioned members upon movement of said sleeve member.

6. In a device of the class described, the combination with a stationary and a movable member; of a sleeve applied to said stationary member and partially rotatable thereon, means to limit the rotative movement of said sleeve, and means carried on said sleeve adapted for automatic coöperation with said stationary and movable members to lock the same together upon movement of said sleeve to a predetermined point.

In testimony whereof we affix our signatures in presence of two witnesses.

LIPPMAN BAUM.
CHARLES X SANDLER.
his mark

Witnesses:
LEON GOODMAN,
JAMES L. CRAWFORD.